(12) United States Patent
Daoud (10) Patent No.: US 6,877,435 B2
(45) Date of Patent: Apr. 12, 2005

(54) DUAL-STAGE GAS GENERATOR UTILIZING ECO-FRIENDLY GAS GENERANT FORMULATION

(75) Inventor: Sami Daoud, Bedford, MA (US)

(73) Assignee: Textron Systems Corporation, Wilmington, MA (US)

(*) Notice: Subject to any disclaimer, the term of this patent is extended or adjusted under 35 U.S.C. 154(b) by 96 days.

(21) Appl. No.: 10/242,494

(22) Filed: Sep. 12, 2002

(65) Prior Publication Data
US 2004/0056458 A1 Mar. 25, 2004

(51) Int. Cl.$^7$ ............................ C06D 5/00; C06B 31/28; C06B 25/34
(52) U.S. Cl. ........................... 102/530; 149/46; 149/92; 280/741; 280/743.1
(58) Field of Search ............................. 280/741, 743.1; 149/46, 92; 102/530

(56) References Cited

U.S. PATENT DOCUMENTS

| | | |
|---|---|---|
| 3,862,866 A | 1/1975 | Timmerman et al. |
| 3,898,254 A | 8/1975 | Combs, Jr. et al. |
| 3,901,530 A | 8/1975 | Radke |
| 3,960,390 A | 6/1976 | Goetz |

(Continued)

OTHER PUBLICATIONS

Fedoroff et al., "Encyclopedia of Explosives and Related Items," Picatinny Arsenal (Dover, New Jersey), p. A333, (Sep. 5, 1960).

Dornheim, Michael A., "Airbag Passes Test on Mars," Aviation Week & Space Technology, (Jul. 14, 1997).

"LLM-105 Process Development", (visited Aug. 16, 2002) <http://www.cms.llnl.gov/LLM>.

Primary Examiner—Aileen Felton
(74) Attorney, Agent, or Firm—McDermott Will & Emery LLP

(57) ABSTRACT

This invention relates to a gas generator having two or more compartments, each with a separate initiator, with one compartment discharging before another, i.e., the compartments discharge sequentially. Each compartment has the same propellants, but the propellants have different geometries in each compartment, which results in different rates of gas evolution from each compartment.

The new gas generator is designed to reach maximum inflation at the same time as the current, single stage gas generators. However, the new generator has a more rapid initial inflation, followed by a more gradual inflation rate in the subsequent stages, improving safety to occupants.

The propellant used in new generator comprises (1) ammonium nitrate as the oxidizer, which is less toxic and corrosive than the currently-used azide, (2) a fuel such as CL-20, and (3) a binder such as polycaprolactone. No hot metal particles (e.g., CuO) are generated in the new system. This means that the complex, expensive filtering system in the current airbag systems is not needed, nor is there a need to use coated airbags.

18 Claims, 6 Drawing Sheets

U.S. PATENT DOCUMENTS

| | | | |
|---|---|---|---|
| 5,022,674 A | 6/1991 | Frantom et al. | |
| 5,378,018 A | 1/1995 | Ketterer et al. | |
| 5,482,579 A | 1/1996 | Ochi et al. | |
| 5,593,180 A | 1/1997 | Cuevas et al. | |
| 5,634,661 A | 6/1997 | Dahl et al. | |
| 5,639,986 A | 6/1997 | Evans | |
| 5,707,078 A | 1/1998 | Swanberg et al. | |
| 5,803,493 A | 9/1998 | Paxton et al. | |
| 5,806,885 A | 9/1998 | Hock | |
| 5,820,162 A | 10/1998 | Fink | |
| 5,865,464 A * | 2/1999 | Kanuma et al. | 280/743.1 |
| 5,876,062 A | 3/1999 | Hock | |
| 5,918,900 A | 7/1999 | Ennis | |
| 5,957,492 A | 9/1999 | Hofbauer et al. | |
| 6,050,601 A | 4/2000 | Pantke et al. | |
| 6,089,597 A | 7/2000 | Leifheit et al. | |
| 6,143,103 A * | 11/2000 | Ryder | 149/46 |
| 6,156,137 A * | 12/2000 | Lundstrom et al. | 149/45 |
| 6,199,906 B1 | 3/2001 | Trevillyan et al. | |
| 6,237,950 B1 | 5/2001 | Cook et al. | |
| 6,315,322 B1 | 11/2001 | Mika | |
| 6,340,175 B1 * | 1/2002 | Hughes et al. | 280/741 |
| 6,447,007 B1 | 9/2002 | DiGiacomo et al. | |
| 6,669,230 B1 * | 12/2003 | Nakashima et al. | 280/735 |
| 2002/0006178 A1 | 1/2002 | Takagi | |

* cited by examiner

DUAL-STAGE GAS GENERATOR UTILIZING ECO-FRIENDLY GAS GENERANT FORMULATION

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

This invention relates to a multi-stage gas generator that utilizes an improved gas generant formulation. Gas generators (also known as inflators) have numerous applications in the commercial and consumer market. For example, they are used to deploy airbags used in automobiles, inflate floatation devices, and can be used in oxygen generating devices. Gas generators operate by burning a propellant contained therein extremely rapidly, usually in the millisecond range. For example, propellant is burned in side airbags in approximately 6–15 milliseconds; in passenger airbags in approximately 40–100 milliseconds; and in driver airbags in approximately 25–40 milliseconds. Most of the discussion in this application relates to automobile airbags, but similar principles apply to all types of inflators.

Until now, gas generators have burned the propellant in automobile airbags in one stage, causing, in some cases, injury to some adults and to children.

The propellants used in airbags have generally contained sodium azide, which, upon ignition, yielded particulates, including hot metallic oxides, and corrosive products, thus requiring expensive filtering systems to be certain these products do not harm the occupants. Alternative propellants have produced high temperature effluent and/or $NO_x$ gases, which also have required systems to protect the occupants of the car. Such airbag systems have also required various protective coatings, in order to prevent damage to the bags caused by the harmful by-products of combustion.

To date, uniform and reliable gas generation, for the systems indicated above, has been difficult to achieve, both mechanically (with respect to gas generation rate or slope) as well as chemically (with respect to control of the solid particulates and effluent resulting from propellant combustion). To date, at least one or more of the components (e.g., oxidizers) of the gas generants have been metal-based, leading to the formation of hot metallic solids or particulates as byproducts of combustion. The major airbag manufacturers still continue to use sodium azide ($NaN_3$) as the main fuel constituent in their gas generant formulation and metallic oxides (e.g., copper oxide, iron oxide, molybdenum trioxide) as major oxidizer constituents in their formulations. These formulations generate, upon combustion, very hot copper-based, iron-based, or molybdenum-based solid byproducts, as well as $NO$, $NO_2$, $SO_2$, $CO$, and $CO_2$, which have levels strictly enforced by the American Conference of Governmental Industrial Hygienists, and which many times can escape controls. Some of these combustion byproducts are extremely toxic to humans and are of great concern, despite the assurances of manufacturers that current gas generators produce such gas generant byproducts in only small quantities.

Some airbag systems have been based on propellants aside from sodium azide (see, for example, U.S. Pat. No. 5,482,579, where cellulose acetate, perchlorate and a metal oxide were used). However, these systems still generate hot metal particles or toxic or hot gases that require a filtration system to prevent harm to either the occupants or the airbags.

Other variations in airbags have been explored. For example, some use a mechanical means to control airflow in airbags. (See, for example, U.S. Pat. No. 6,050,601.) Mechanical means are, however, relatively slow compared to the extremely fast inflation required in airbags. Others have used systems that rely on stored gas for inflation. (See, for example U.S. Pat. No. 6,089,597.) Because of the difficulty in maintaining stored gas for long periods of time, these systems have not been widely used.

U.S. Pat. No. 5,876,062 relies on using a resistance wire to ignite the propellant. Vibration of the airbag system will cause the ignition wire to break, leading to malfunction of the system. Furthermore, a filtration system is also required. U.S. Pat. No. 6,199,906 relies on electronic logic to determine the extent to which the airbag is deployed. However, the system still generates noxious effluent and attempts to eliminate them through certain gas ports. Furthermore, the system recognizes that there may be accidental ignition of some portions of the system when exposed to heat or fire.

BRIEF SUMMARY OF THE INVENTION

This invention relates to a gas generator having two or more compartments, each with a separate initiator, with one compartment discharging before another (i.e., the compartments discharge sequentially). Each compartment has the same propellants, but the propellants have different geometries in each compartment, which results in different rates of gas evolution from each compartment. The gas generator of the present invention is designed to reach maximum inflation (i.e., to deploy) in the same amount of time as the current, single-stage gas generators. However, compared to previously known gas generators, the generator of the present invention has a more rapid initial inflation, with a more progressive propellant geometry, followed by a more gradual inflation rate in the subsequent stages, improving safety to occupants.

In general terms, the propellant (or gas generant) used in new generator includes (1) ammonium nitrate as the oxidizer, which is non-toxic and non-corrosive, as opposed to existing airbag propellant formulations, (2) a fuel having a high energy density and high stability, such as CL-20- or other suitable fuels, the characteristics of which will be described below and (3) a binder such as polycaprolactone (PCL), Polyisobutylene (PIB), or Glycidyl Azide Polymer (GAP). Fuels that may be used as alternatives to, or in combination with, CL-20 for the fuel of the present invention have comparable or greater values of the following physical characteristics: density, heat of formation, and heat of decomposition. Examples of such suitable fuels include, but are not limited to, TATB (tri-amino-trinitro-benzene) and LLM-105 (2,6-diamino-3,5-dinitropyrazine-1-oxide). No hot metal particles (e.g., CuO) are generated in the system of the present invention. This means that the complex, expensive filtering system in the current airbag systems is not needed, nor is there a need to use coated airbags.

BRIEF DESCRIPTION OF THE FIGURES

FIG. 1 shows a two-stage gas generator. For a miniature design, the parts are identified in FIG. 1A and typical dimensions are shown in FIG. 1B. For a larger gas generator, the parts are shown in FIG. 1C and the dimensions in FIG. 1D.

DETAILED DESCRIPTION OF THE INVENTION

This invention relates to a new type of gas generator that is usable in the commercial and consumer markets, such as automobile airbags, floatation devices, oxygen generating devices and other applications. These gas generators have at least two chambers, which condition allows the respective gas volumes to be produced under different conditions, i.e., the profile of pressure vs. time for the gas volume produced by each chamber can be different. In this way, by designing multiple chambers differently, the gas generator can be adapted to the need of the particular application. For example, in order to reduce the potential risk of air-bag induced physical trauma to occupants of an automobile, a dual-chamber gas generator can be used, with one chamber being designed to provide an initial very quick (compared to previously known gas generators) partial deployment of the airbag, and the second chamber being designed to provide a second, much slower expansion of the airbag.

The airbag is designed to activate upon rapid deceleration of the vehicle, such as that which occurs upon impact between an automobile and an object. An inertial switch is triggered, causing the inflator (gas generator) to deploy the airbag.

A variety of design considerations must be taken into account in developing an airbag passive restraint system. First, the inflator must be capable of producing and/or releasing a sufficient quantity of gas to the airbag within the time limitation required of passive restraint air bag systems. Given the time limitation involved in airbag restraint systems, the airbag must deploy in roughly about 5–100 milliseconds, depending upon the size of the airbag. Inflators must generally be capable of filling an air bag in these time frames with 15 to 200 liters, depending on the intended application.

In its operation, the gas generator receives a signal from an exterior source, which would typically be a microelectromechanical system (MEMS) accelerometer, and then sends this signal to each initiator. The initiators function sequentially, with a delay (on the order of millisecond(s)) between the ignition of each initiator. The gas generant in each chamber of the dual-chamber gas generator is generally the same, formulation-wise, with each gas generant having a different geometry. Essentially, the gas generants may have a cylindrical, hexagonal, or rosette (the most efficient) geometry, with 37, 19, 7, or 1, (or none at all) perforations. Depending on the desired application, the second gas generant in the second chamber (as well as any subsequent gas generants in additional chambers) may be less progressive (with fewer perforations), neutral, or regressive as compared to the first gas generant. In a preferred two-chamber airbag, the ratio of gas generation in the first chamber to that in the second chamber is greater than one. For example, for the gas produced by the first chamber, the change of pressure as a function of time may be two (or more) times greater than the change of pressure as a function of time for the gas produced from the second chamber.

Upon receipt of the signal to the initiator(s), the more progressive gas generant undergoes rapid ignition and generates sufficient pressure to inflate the airbag to 35–85% of its full capacity, preferably 45% to 85% of its capacity, and most preferably 65%–85% of its full capacity. The second gas generant (in the second chamber), is initiated at some given time $t=45\%-95\%$ of $t_{pmax \ (first \ gas \ generator)}$, (i.e., when 45–95% of the gas has been generated from the first generator), preferably 65%–95% of $t=45\%-95\%$ of $t_{pmax \ (first \ gas \ generator)}$, but most preferably at $t=90\%-95\%$ of $t_{pmax \ (first \ gas \ generator)}$.

The gas generant in the second chamber provides the remaining inflation of the airbag to achieve an overall internal gas pressure equal to the pressure rated for that airbag for that specific subsystem. That is, when the gas has been completely generated from both chambers of the novel system, the final gas pressure in the airbag is equal to that from the current, one-stage, gas generators. The rate of gas generation in the proposed art is controlled by means of providing propellants that generate different rate of gas release. By providing different rates of gas release, the pressure versus time curve would have two slopes for the two-stage system. One slope (the first gas generant in the first chamber) would have a very steep slope $[(dp)_1/)dt)_1]$. The second slope (for the second gas generant) would have a less steep slope $[(dp)_2/(dt)_2$ The effective time to maximum volume (which corresponds to the full deployment of the airbag) would still be the same, but would be controlled in a manner that would prevent a powerful shock to the passenger. In the commercial industry, this performance is advantageous, as it prevents severe accidental mishaps and possible fatalities, which may occur when an airbag deploys in a vehicle moving at speeds over 100 mph or deploys into children, light-weight passengers, or those smoking pipes.

Having systems with even more than two chambers allows even better control of the pressure vs. time curve, thus enabling the designer to match nearly any pressure vs. time profile.

A typical dual stage (or two-stage) generator according the present invention is shown in FIG. 1. A small-size (miniature size) design is shown in FIG. 1A. In this design two combustion chambers 1 exist within the housing enclosure 2, and are separated by a 3.00-mm thick wall 3. Each combustion chamber contains a propellant 4, with both propellants having the same formulations but different geometry. Propellant geometry is selected to produce the desired $1^{st}$ and $2^{nd}$ stage-performance. Two igniters exist, one for each combustion chamber. The two igniters are designed to function with a 5–20 ms. difference between the progressive (quicker or high $R_Q$),and the neutral (slower, or low $R_Q$) burning propellant. The igniters consist of an ignition enhancer 5, which surrounds the initiator 6 and is designed to boost the power of a propellant upon ignition. Rupture disks 7 allow the released gas to be funneled into the gas ports 8, where the gas is released. In certain embodiments, e.g., the miniature design such as that used in side airbags, a slag filter 9 (heat sink) may be used advantageously. The slag filter is used as a heat sink and not as a particulate filter. The hot gases produced by the gas generator pass through the slag filter and lose heat to the slag filter by conductive heat transfer. In exemplary embodiments, the slag filter may be coated with a sodium aluminosilicate powder, also known as zeolite (e.g., Zeolite CVB-100). This is the case when the gas generant includes CL-20, GAP, and $KNO_3$. In such embodiments, the zeolite coating acts to (1) reduce the gas temperature, thereby reducing the likelihood of burn injuries to passengers, and (2) trap harmful gases such as $NO_x$ and CO. In other words, the zeolites act as molecular traps for larger-size diatomic and polyatomic gases. The percent of zeolites used in the slag filter may range from between 1 and 10%, more preferably from between 3 and 7%, and most preferably at 5%, by weight of the filter. Alternatively, suitable high-surface-area materials may be used to effect the same result.

Figure 1A:
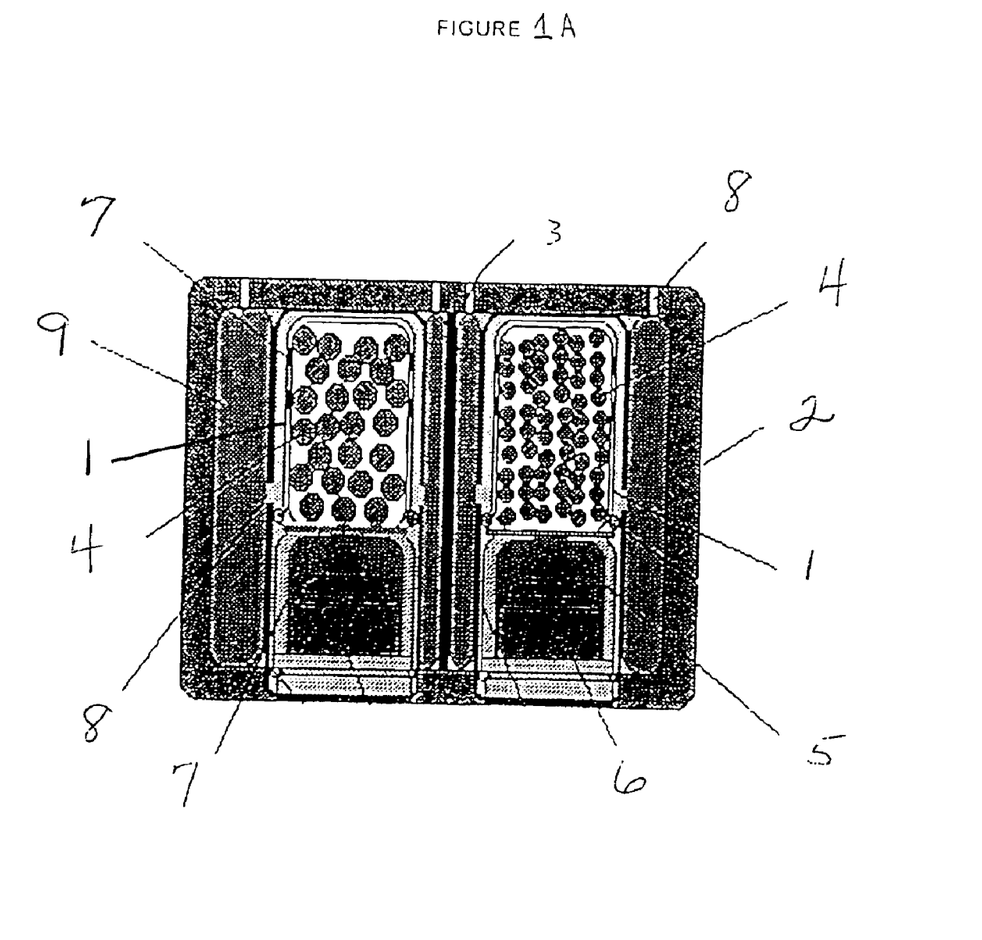
Figure 1B:
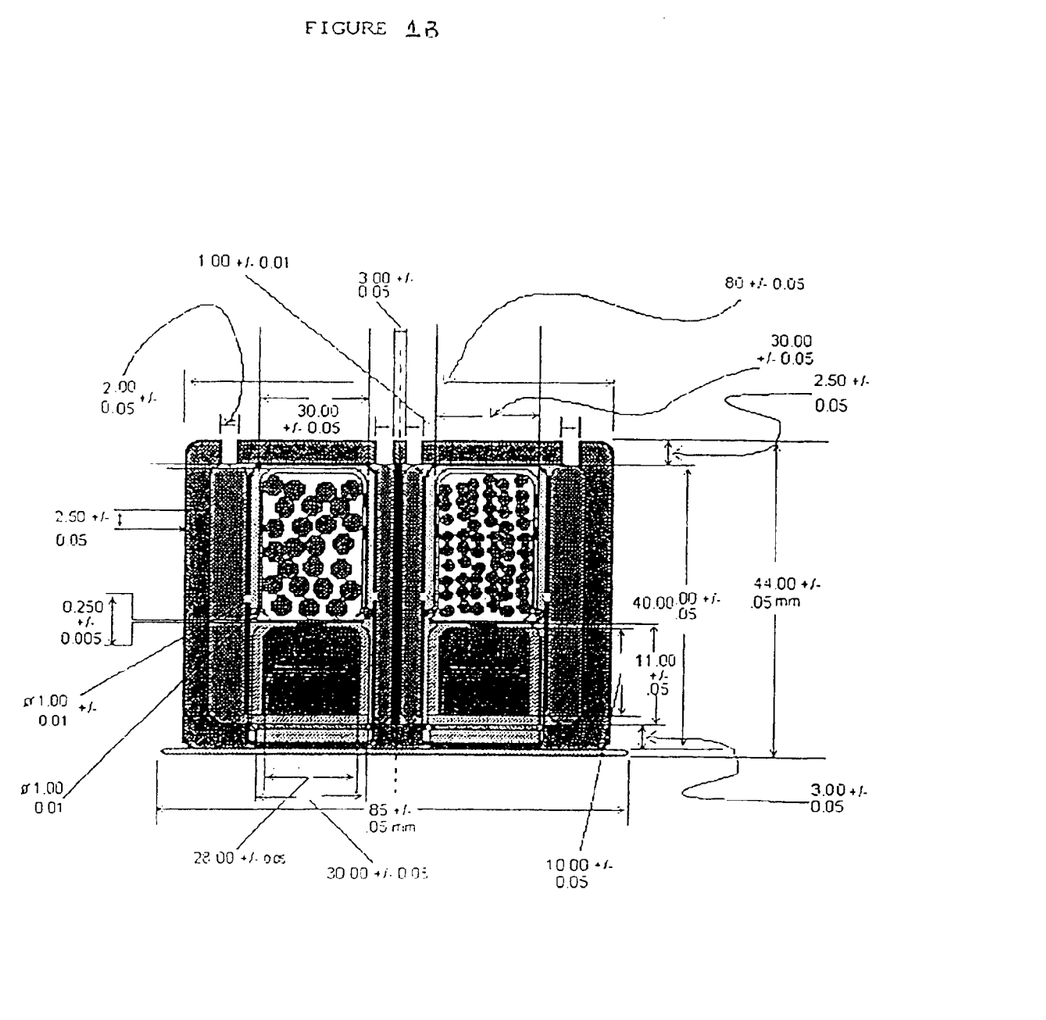

A gas generator for a typical airbag can be quite small. The overall dimensions for one used in a driver-side airbag can be approximately 85 mm×44 mm. (The dimensions of such a typical gas generator are shown in FIG. 1B)

For airbags requiring more output (e.g., the passenger airbag), more propellant weight is needed and a larger gas generator must be used. The amount of propellant can be calculated and the size gas generator adjusted accordingly.

Figure 1C:
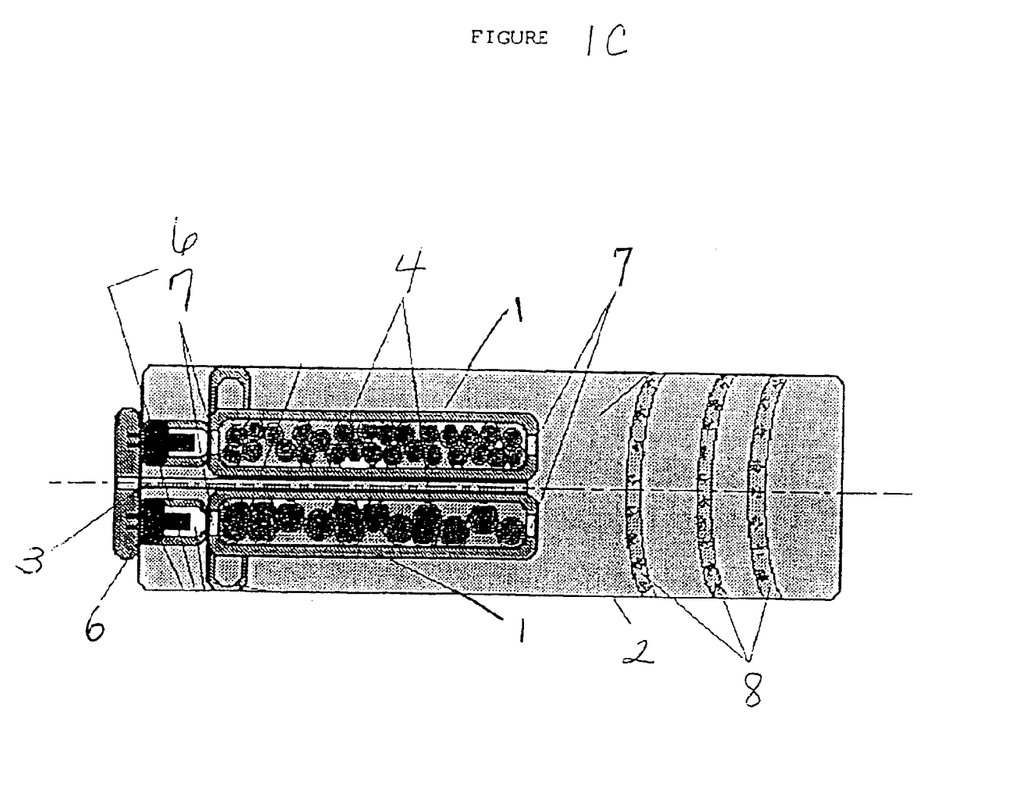
Figure 1D:
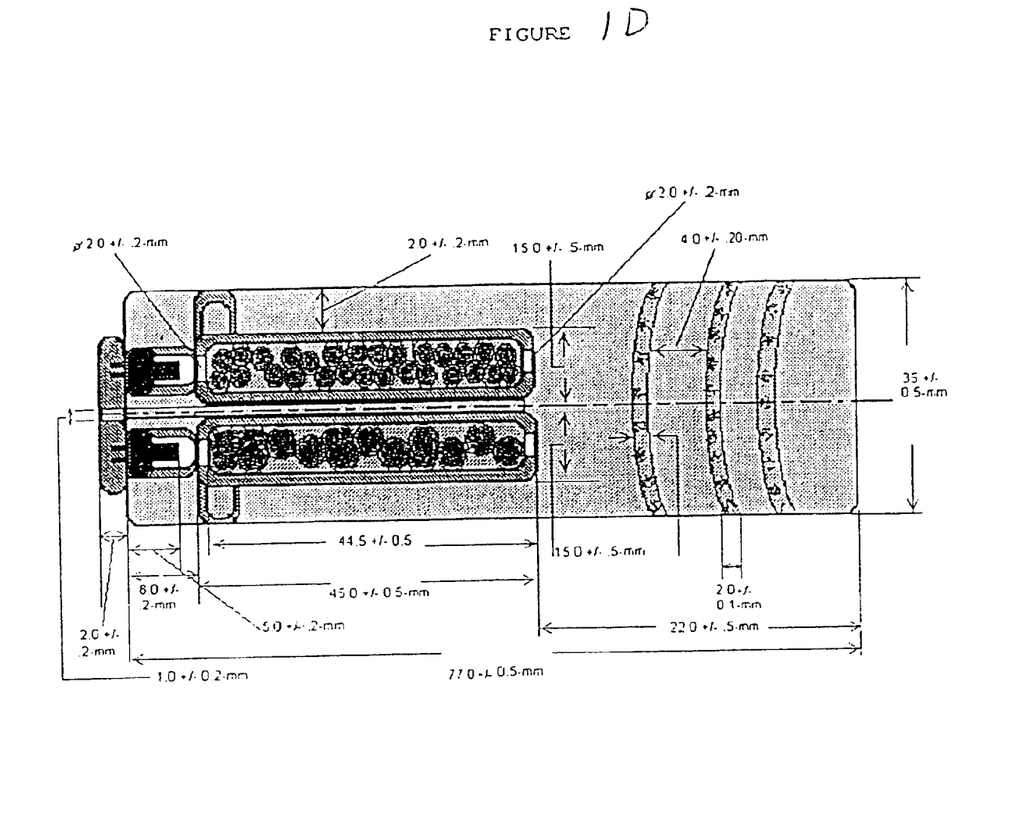

Embodiments of the present invention according to the design shown in FIGS. 1C and 1D are principally the same, but they are larger in size, with greater mass of the propellant. The partition between the two combustion chambers is aimed at eliminating unnecessary safety concerns, namely preventing propagation to the adjacent combustor port. If one propellant is deployed, the heat produced by the reaction may heat up the propellant in the adjacent chamber, and, upon deploying the second, a severe high pressure may cause the airbag to malfunction.

Other considerations in designing an inflator for a passive airbag restraint system, particularly for automotive applications, include the toxicity and noxiousness of the gas that fills the airbag. The inflator for an airbag must exhaust or filter gas and other materials, which are hazardous to the occupant or which might damage parts of the airbag. If the gas-generating composition is highly toxic or unstable, special handling may be required during the manufacturing process and may create disposal problems at the end of the useful life of the vehicle. For example, raw sodium azide, used as the gas-generating composition in most gas generators (for airbag applications), has a relatively high toxicity, which creates handling problems during the manufacturing process.

Currently used airbags must be coated to prevent damage to the bags. Packaging restrictions add a further design consideration in the development of passive airbag inflators. For example, weight and size are primary factors in determining the suitability of vehicle inflator designs.

Figure 3:
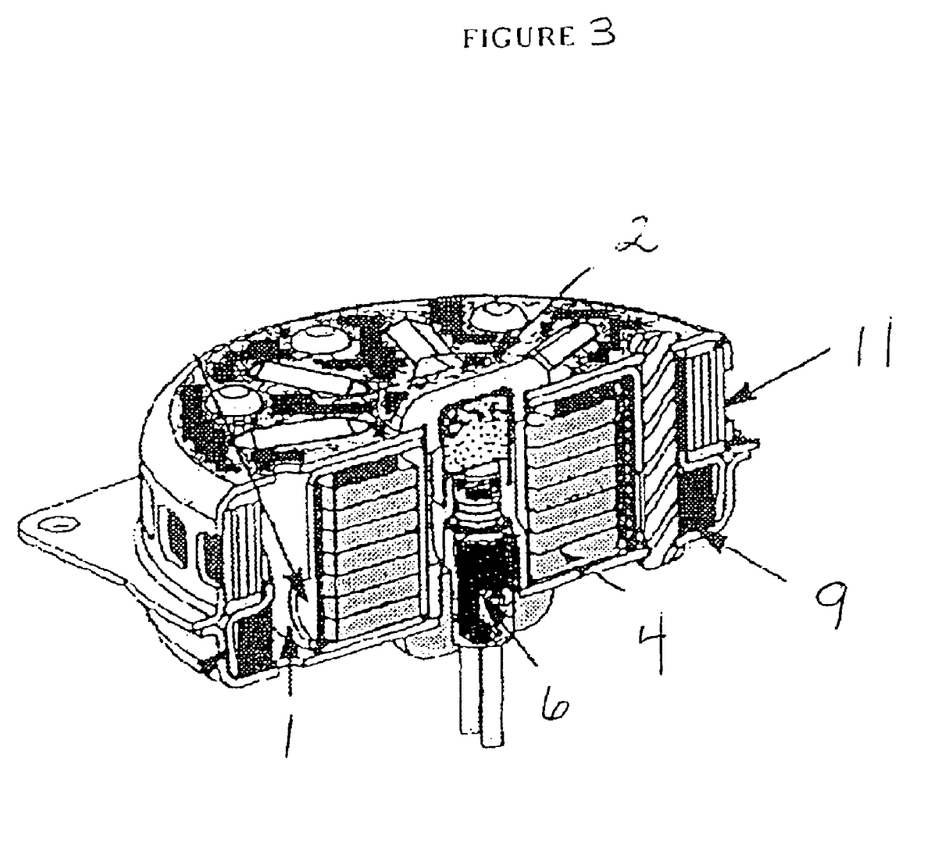
FIG. 3 shows a typical single-stage gas generator currently used.

In the novel gas generator disclosed herein, the need for complex, expensive filter systems (to remove hot, solid byproducts) is eliminated. (Filters are required in the current, one-stage gas generators. See part 11 in FIG. 3.) Elimination of the complex, expensive filter system means at least a 4% reduction in the cost of the gas generator.

The objective of the present invention is to provide a gas generator with reduced weight, size and fewer geometric constraints from the design perspective. It is also an objective to eliminate the need for a filter system. It is also an objective to provide a gas-generating inflator, which eliminates or at least reduces the size of the internal structural members of the pressure vessel (combustion chamber). It is a further objective to provide a less costly gas generator, both in terms of fewer parts and lower process manufacturing operations.

The propellant used in the new gas generators is also new and comprises an oxidizer, a fuel, and a binder that is used to hold the components together. The propellant used herein has outstanding performance, is more environmentally acceptable than currently used propellants, and does not require the filtration systems currently needed in gas generators.

The oxidizer is preferably ammonium nitrate, which comprises approximately 89.5±5.5% of the propellant. The oxidizer must be phase stabilized to prevent melting and recrystallization to different particle size. An example of a suitable phase stabilizer is $KNO_3$ (Potassium Nitrate), which is present at a concentration of 0.5% to 7% and which also prevents flash generation; the preferable concentration of the Potassium Nitrate is 0.5% to 1%. This nitrogen-rich oxidizer, when stabilized is insensitive to impact, shock and electrostatic discharge, which makes it safe to handle, to manufacture, and to package. The phase-stabilized ammonium nitrate prevents phase transition of the oxidizer during thermal cycling.

The fuel comprises approximately 8.4±5.0% of the propellant. Suitable fuels include nearly all nitramines, including CL-20 ($C_{10}H_{22}N_{12}O_{12}$) (Thiokol Corporation), RDX ($C_3H_6N_6O_6$), HMX ($C_4H_8N_8O_8$), GAP ($C_3H_5N_3O)_n$ (Glycidyl Azide Polymer, or polycyclidyle azide) (3M Corporation, Minnesota), EDNA (ethylene dinitramine), TATB, LLM-105 and mixtures thereof. The preferred fuel is CL-20.

The binder comprises approximately 2.1±0.5% of the propellant and acts (1) as a binder to hold components together; and (2) to prevent fracture of crystals, which would result in gas generating too fast. Suitable binders include polycaprolactone (PCL), polyisobutylene (PIB), polyvinylpyrrolidone and mixtures thereof.

GAP can be used as a combined fuel and binder. However, its combustion byproducts are toxic and increased amounts of ammonium nitrate are needed to overcome this negative. These higher concentrations of ammonium nitrate make the formulation difficult to process and to ignite.

The propellant formulation may be processed either as a wet or dry mixture and pressed into tablets, disks or other shapes or extruded into granules. Commonly used blending techniques, such as those discussed in M. E. Fayed & L. Otten, Handbook of Powder Science and Technology (1984), Emil R. Riegel, Chemical Process Machinery ($2^{nd}$ Ed. 1960, and Wolfgang Pietsch, Size Enlargement by Agglomeration Ch. 4 (1991), can be used.

The propellant used in the different chambers generally have the same chemical composition, but they often differ in geometry, which impacts the rate of burning of the propellant in each chamber. For example, a propellant with more perforations has more surface exposure, which results in faster burning.

Figure 2:
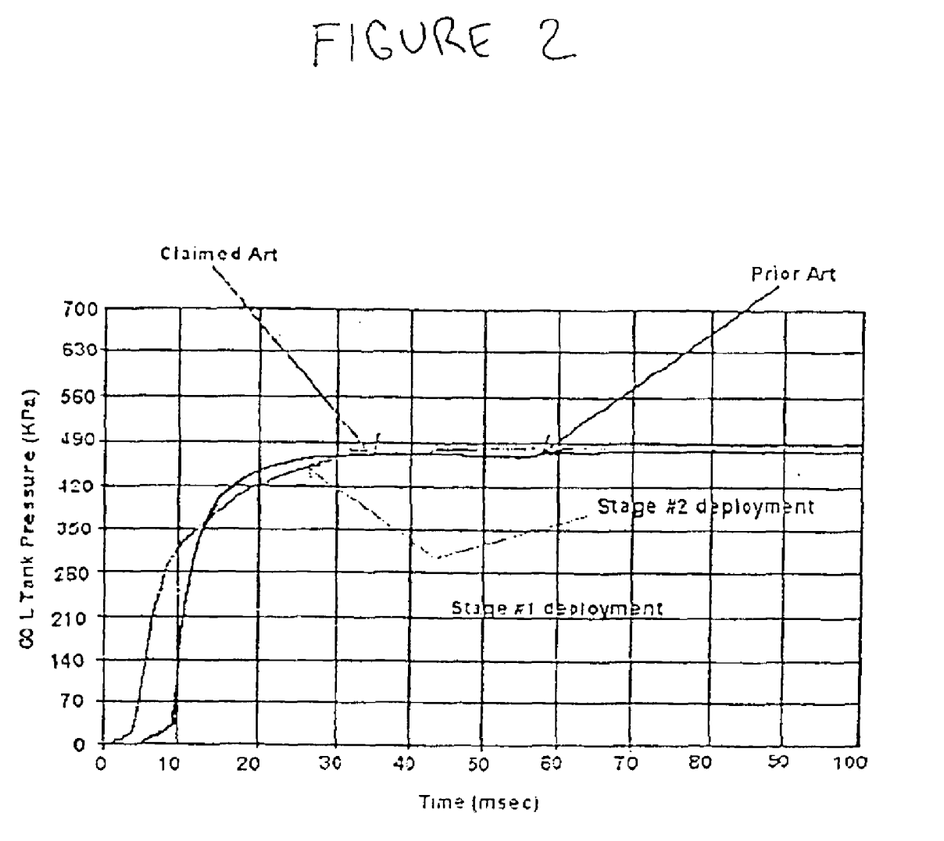
FIG. 2 shows the deployment of a two-stage gas generator compared to that of a single-stage gas generator.

The ability to vary both the time of ignition of each chamber along with varying the perforation geometry yields ultimate control over the inflation characteristics of the airbag. That is, the change of pressure with time can be controlled very well. For example, see FIG. 2, where a two-chamber gas generator is used. At the initial part of the inflation, change of pressure vs. time is much steeper than the control (single stage gas generator), while the rate of change in the second stage is more gradual than the control. Using an airbag having the two-stage gas generator has a much lower risk of injury to an occupant vs. the control.

The density of the propellant is also an important indicator of its suitability. The preferred density should be approximately 92% or greater than the theoretical density. If the density is too low, not as much propellant can be fit into the chambers. Second, if the density is low, the propellant has a greater likelihood that it will fracture, leading to a different geometry of propellant, which will, as discussed above, have an effect on the burn rate.

The combustion of the propellant is safe, with the flame temperature of the gaseous products of reaction being less than 120° F. The products of combustion are generally limited to non-hazardous gases, namely water vapor, nitrogen, and $CO_2$. These products are not hazardous to the environment. In addition, they are not corrosive, which means that uncoated airbags can be used in the system.

The amount of propellant in the novel gas generator is much less than is needed in currently used generators. Typically 70–100 gm. of propellant is used currently, while 5–8 gm is needed for the novel generator used for driver airbags. About 8–15 gm of propellant is needed for the novel passenger airbag, while 2–5 gm is needed for the novel side airbag.

To evaluate the performance of the gas generator, it is possible to use a ballistic tank test. The tank should have a capacity at least as large as the airbag for which the gas generator is used. Any commonly used ballistic test procedures can be used to evaluate the performance of the gas generator.

The following examples are intended to further illustrate, not limit, the invention disclosed herein.

EXAMPLE 1

A Two-stage Gas Generator

A two-stage gas generator is shown in FIG. 1. FIG. 1A shows the parts of the generator, while FIG. 1B shows an embodiment (including dimensions) used in a side-airbag. The total weight of propellant in this system is approximately 5 to 10 gm. The propellant mass per chamber ranges from 5 to 10 grams for a Driver-side airbag, 10 to 15 grams per Passenger-side airbag, and 2 to 5 grams for a side-impact airbag.

EXAMPLE 2

The performance of an embodiment of one propellant according to the present invention (see Table 1A), compared to two previously used propellants (Tables 1B and 1C), is shown as evaluated by a thermochemical simulation program (written in FORTRAN). The program shows the theoretical, thermochemical performance of the gas generant. The output shown lists, among other things, the expected theoretical density, the reaction temperature inside the chamber, the ratio of specific heats (shown as gamma), and the energy (impetus). It also lists the expected byproducts of combustion in moles, wt %, mole %, and volume %. The output values shown are based on 100 grams of propellant.

Those familiar with this technology area will recognize that there are other variations of the invention that are consistent with the invention disclosed herein. While certain dimensions have been provided regarding exemplary embodiments, such embodiments or dimensions do not limit the scope of the present invention. The present invention may include any embodiments of any size that encompass the aspects described herein or equivalents thereto.

TABLE 1A

**** THERMOCHEMICAL CALCULATION OF CLAIMED ART ****

0RUN DATE

NON IDEAL EQUATION OF STATE DUAL-STAGE PROPELLANT SYSTEMSENG

| POLYCAPROLACTONE | | 2.100 | | | |
|---|---|---|---|---|---|
| CL-20 | | 8.400 | | | |
| AMMONIUM NITRATE | | 89.500 | | | |
| + | | | DATE | SETUP 1 | |
| 0HFP = −97684.35 | | THEO DENSITY = 1.7252 GM/CC, .062327 LBM/IN**3 E = .0 | | | |
| EFP = −94499.59 | | OXYGEN BALANCE = 13.47 TO CO2, 17.11 TO CO OMOX = 15.9659 | | | |
| C .22701 | H 4.6566 | | N 2.4695 | O 3.6245 | |
| 0CHAMBER (CONSTANT + VOLUME) | | | | | |
| P = 2000.00 | PSI P = 136.092 | ATM T = 2233.2 | NG = 4.21529 | NT = 4.21529 | S = 239.117 |
| CPG = 47.069 | CPT = 47.069 | FIXED CP GAMMA = 1.216 | DHDT = 51.0090 | GAMMA = 1.21999 | |
| WT PCT COND = .00000 | MW GAS = 23.723 | H = −75468. | COV = .98783 | VSP = 57.7466 | |
| SONIC VEL = 985.635 + | RHO = .01731705 | P0 = 1.0000 | V0 = 57.7466 | IMPETUS = 261846. | |
| E = −94499.592 | DEDT = 42.5243 | | | | |

| PRODUCT | MW | MOLES | WT. % | MOLE % | VOL. % |
|---|---|---|---|---|---|
| C H2O | 30.02649 | 8.30407E−12 | .0000 | .0000 | .0000 |
| C H3 | 15.03506 | 1.62778E−18 | .0000 | .0000 | .0000 |
| C H4 | 16.04303 | 1.68767E−18 | .0000 | .0000 | .0000 |
| C N | 26.01785 | 6.57492E−16 | .0000 | .0000 | .0000 |
| C O | 28.01055 | 4.65679E−04 | .0130 | .0110 | .0110 |
| C O2 | 44.00995 | 2.26548E−01 | 9.9703 | 5.3744 | 5.3744 |
| C2H | 25.03027 | 1.50358E−26 | .0000 | .0000 | .0000 |
| C2H2 | 26.03824 | 2.79716E−25 | .0000 | .0000 | .0000 |
| C2H4 | 28.05418 | 1.55417E−29 | .0000 | .0000 | .0000 |
| C2H6 | 30.07012 | 1.02119E−34 | .0000 | .0000 | .0000 |
| C2N | 38.02900 | 1.02478E−26 | .0000 | .0000 | .0000 |
| C2N2 | 52.03570 | 1.23619E−24 | .0000 | .0000 | .0000 |
| C4N2 | 76.05800 | 1.03091E−46 | .0000 | .0000 | .0000 |
| H | 1.00797 | 3.54711E−05 | .0000 | .0008 | .0008 |
| H C N | 27.02582 | 3.31191E−13 | .0000 | .0000 | .0000 |
| H C O | 29.01852 | 1.16098E−10 | .0000 | .0000 | .0000 |
| H N C O | 43.02522 | 1.13069E−10 | .0000 | .0000 | .0000 |
| H N O | 31.01407 | 1.78524E−06 | .0001 | .0000 | .0000 |
| H N O2 | 47.01347 | 1.75070E−05 | .0008 | .0004 | .0004 |
| H O2 | 33.00677 | 2.20361E−04 | .0073 | .0052 | .0052 |
| H2 | 2.01594 | 8.94181E−04 | .0018 | .0212 | .0212 |
| H2O | 18.01534 | 2.32035E+00 | 41.8020 | 55.0461 | 55.0461 |

TABLE 1A-continued

**** THERMOCHEMICAL CALCULATION OF CLAIMED ART ****

| | | | | | |
|---|---|---|---|---|---|
| N | 14.00670 | 3.55303E−09 | .0000 | .0000 | .0000 |
| N C O | 42.01725 | 1.39350E−12 | .0000 | .0000 | .0000 |
| N H | 15.01467 | 5.69963E−10 | .0000 | .0000 | .0000 |
| N H2 | 16.02264 | 1.74659E−09 | .0000 | .0000 | .0000 |
| N H3 | 17.03061 | 1.41402E−08 | .0000 | .0000 | .0000 |
| N O | 30.00610 | 2.48521E−02 | .7457 | .5896 | .5896 |
| N O2 | 46.00550 | 2.20813E−04 | .0102 | .0052 | .0052 |
| N2 | 28.01340 | 1.22221E+00 | 34.2382 | 28.9946 | 28.9946 |
| N2O | 44.01280 | 8.81925E−06 | .0004 | .0002 | .0002 |
| O | 15.99940 | 3.70514E−04 | .0059 | .0088 | .0088 |
| O H | 17.00737 | 1.37768E−02 | .2343 | .3268 | .3268 |
| O2 | 31.99880 | 4.05303E−01 | 12.9692 | 9.6151 | 9.6151 |
| O2N H | 47.01347 | 1.52263E−05 | .0007 | .0004 | .0004 |
| C(C) | 12.01115 | 0.00000E+00 | .0000 | .0000 | .0000 |

TABLE 1B

**** THERMOCHEMICAL CALCULATION ****

0RUN DATE
NON IDEAL EQUATION OF STATE AZIDE-BASED PROPELLANT SYSTEMSENG.
SODIUM AZIDE                39.000
CUPRIC OXIDE                61.000
+                                                       DATE                    SETUP 163
0HFEP = −25520.07              THEO DENSITY = 3.2759 GM/CC, .118350 LBM/IN**3 E = .0
EFP = −24759.72                OXYGEN BALANCE = −4.80 TO CO2, −4.80 TO CO OMOX = 1.0000
AL .1000E−6        CR .1000E−6        CU .76692        N 1.7997        NA .59991
O .76692           SI .1000E−6
0* * * EQUILIBRIUM CONVERGENCE FAILURE * * *
0DIAGNOSTIC OUTPUT - - 151 ITERATIONS
P = 136.09193        T = 1364.42439        NG = .941609         NT = 1.597600    CPG = 7.76458
CPT = 22.05790       DH/DT = .0000000      DLVPT = .0000000     DLVTP = .0000000
GAMS = .000000       ASQ = .00000000       USQ = .00000000      VSP = 830.972662
GE = 1.0000000       AE/AT = 1.00000       H = −13232.50899     S = 77.20398
COVTOT = 55.06294    DTDP = 1.44585789E−02 PARGAM = −3.75007042E+08
DEDT = .00000000     E = −15971.20632

| 0PRODUCT | MW | | MOLES | | WT. PCT. |
|---|---|---|---|---|---|
| AL | 9.619956E−37 | AL N | 2.430342E−42 | AL O | 5.142560E−29 |
| AL O2 | 1.570222E−22 | AL2 | 5.231322E−69 | AL2O | 4.076411E−49 |
| AL2O2 | 2.224270E−41 | CR | 5.586875E−26 | CR N | 3.447731E−31 |
| CR O | 1.232537E−19 | CR O2 | 5.935214E−13 | CR O3 | 1.253956E−09 |
| CU | 1.290954E−10 | CU O | 8.139506E−11 | CU2 | 5.285581E−16 |
| N | 1.052861E−16 | N O | 3.064463E−04 | N O2 | 1.333056E−05 |
| N O3 | 2.963984E−11 | N2 | 8.997028E−01 | N2O | 2.218935E−07 |
| N2O3 | 1.269631E−12 | N2O4 | 6.644321E−15 | N2O5 | 1.739548E−17 |
| N3 | 1.240565E−18 | NA | 5.522906E−07 | NA O | 4.407723E−07 |
| NA2 | 2.944327E−12 | O | 9.030945E−09 | O2 | 4.158483E−02 |
| O3 | 9.065619E−11 | SI | 2.121755E−47 | SI N | 6.231971E−46 |
| SI O | 3.599509E−29 | SI O2 | 2.883367E−25 | SI2 | 1.066979E−85 |
| SI2N | 8.448944E−81 | SI3 | 1.533248-121 | AL(C) | 0.000000E+00 |
| AL(L) | 0.000000E+00 | AL N(C) | 0.000000E+00 | AL2O3(C) | 0.000000E+00 |
| AL2O3(L) | 0.000000E+00 | AL2SI O5(C) | 0.000000E+00 | CR(C) | 0.000000E+00 |
| CR(L) | 0.000000E+00 | CR N(C) | 0.000000E+00 | CR2N(C) | 0.000000E+00 |
| CR2O3(C) | 4.937273E−08 | CR2O3(L) | 0.000000E+00 | CU(C) | 0.000000E+00 |
| CU(L) | 0.000000E+00 | CU O(C) | 0.000000E+00 | CU2O(C) | 3.834578E−01 |
| CU2O(L) | 0.000000E+00 | NA(C) | 0.000000E+00 | NA(L) | 0.000000E+00 |
| NA AL O2(C1) | 0.000000E+00 | NA AL O2(C2) | 1.000000E−07 | NA O2(C) | 0.000000E+00 |
| NA2O(C1) | 0.000000E+00 | NA2O(C2) | 0.000000E+00 | NA2O(C3) | 2.999537E−01 |
| NA2O(L) | 0.000000E+00 | NA2O2(C1) | 0.000000E+00 | NA2O2(C2) | 0.000000E+00 |
| NA2SI O3(C) | −2.742024E−02 | NA2SI O3(L) | 0.000000E+00 | NA2SI2O5(C) | 0.000000E+00 |
| NA2SI2O5(L) | 0.000000E+00 | SI(C) | 0.000000E+00 | SI(L) | 0.000000E+00 |
| SI O2(C) | 0.000000E+00 | SI O2(L) | 0.000000E+00 | | 0.000000E+00 |

TABLE 1C

**** THERMOCHEMICAL CALCULATION ****

0RUN DATE
NON IDEAL EQUATION OF STATE ORGANIC-BASED PROPELLANT SYSTEMS ENG.
SODIUM NITRATE                     56.300

TABLE 1C-continued

**** THERMOCHEMICAL CALCULATION ****

| | | | | | |
|---|---|---|---|---|---|
| FERRIC OXIDE | | 20.000 | | | |
| DICYANDIAMID | | 23.700 | | | |
| + | | | DATE | SETUP 18 | |
| 0HFP = −96580.93 | | THEO DENSITY = 2.1896 GM/CC, .079105 LBM/IN**3 E = .0 | | | |
| EFP = −95016.70 | | OXYGEN BALANCE = 1.44 TO CO2, 10.46 TO CO OMOX = 2.5152 | | | |
| C .56374 | FE .25048 | H 1.1275 | N 1.7899 | NA .66239 | |
| O 2.3629 | SI .1000E−6 | | | | |
| 0CHAMBER (CONSTANT + VOLUME) | | | | | |
| P = 2000.00 | PSI P = 136.092 | ATM T = 2284.2 | NG = 1.81797 | NT = 2.25775 | S = 150.999 |
| CPG = 20.005 | CPT = 36.764 | FIXED CP GAMMA = 1.109 | DHDT = 138.436 | GAMMA = 1.08696 | |
| WT PCT COND = 48.460 | MW GAS = 28.350 | H = −865531. | COV = .71030 | VSP = 25.7487 | |
| SONIC VEL = 621.238 | | | | | |
| + | RHO = .03883692 | P0 = 1.0000 | V0 = 25.7487 | IMPETUS = 115510. | |
| E = −95016.700 DEDT = 122.410 | | | | | |

| 0PRODUCT | MW | MOLES | WT. % | MOLE % | VOLUME % |
|---|---|---|---|---|---|
| C H2O | 30.02649 | 8.24300E−11 | .0000 | .0000 | .0000 |
| C H4 | 16.04303 | 1.01707E−16 | .0000 | .0000 | .0000 |
| C O | 28.01055 | 2.32866E−03 | .0652 | .1031 | .1281 |
| C O2 | 44.00995 | 2.80468E−01 | 12.3434 | 12.4225 | 15.4275 |
| FE | 55.84700 | 5.42632E−08 | .0000 | .0000 | .0000 |
| FE O | 71.84640 | 1.30678E−06 | .0001 | .0001 | .0001 |
| FE O2H2 | 89.86174 | 5.80262E−04 | .0521 | .0257 | .0319 |
| H | 1.00797 | 2.84959E−05 | .0000 | .0013 | .0016 |
| H2 | 2.01594 | 7.73359E−04 | .0016 | .0343 | .0425 |
| H2O | 18.01534 | 5.11702E−01 | 9.2185 | 22.6642 | 28.1469 |
| N H3 | 17.03061 | 2.11176E−08 | .0000 | .0000 | .0000 |
| N O | 30.00610 | 5.36905E−03 | .1611 | .2378 | .2953 |
| N O2 | 46.00550 | 1.53782E−05 | .0007 | .0007 | .0008 |
| N2 | 28.01340 | 8.92247E−01 | 24.9949 | 39.5192 | 49.0793 |
| NA | 22.98980 | 2.19243E−03 | .0504 | .0971 | .1206 |
| NA C N | 49.00765 | 1.28532E−10 | .0000 | .0000 | .0000 |
| NA O H | 39.99717 | 9.83087E−02 | 3.9321 | 4.3543 | 5.4076 |
| NA2 | 45.97960 | 1.32663E−06 | .0001 | .0001 | .0001 |
| O | 15.99940 | 7.50704E−05 | .0012 | .0033 | .0041 |
| O H | 17.00737 | 3.03544E−03 | .0516 | .1344 | .1670 |
| O2 | 31.99880 | 2.08448E−02 | .6670 | .9233 | 1.1466 |
| SI | 28.08600 | 2.21135E−20 | .0000 | .0000 | .0000 |
| SI O | 44.08540 | 5.15382E−11 | .0000 | .0000 | .0000 |
| SI O2 | 60.08480 | 1.83294E−10 | .0000 | .0000 | .0000 |
| C(C) | 12.01115 | 0.00000E+00 | .0000 | .0000 | |
| FE O(C) | 71.84640 | 0.00000E+00 | .0000 | .0000 | |
| FE O(L) | 71.84640 | 1.13306E−01 | 8.1406 | 5.0185 | |
| FE2O3(C) | 159.69220 | 0.00000E+00 | .0000 | .0000 | |
| FE2SI O4(C) | 203.77760 | 0.00000E+00 | .0000 | .0000 | |
| FE2SI O4(L) | 203.77760 | 0.00000E+00 | .0000 | .0000 | |
| FE3O4(C) | 231.53860 | 4.55314E−02 | 10.5423 | 2.0167 | |
| NA2C O3(C) | 105.98895 | 0.00000E+00 | .0000 | .0000 | |
| NA2C O3(L) | 105.98895 | 2.80945E−01 | 29.7771 | 12.4436 | |
| NA2O(C3) | 61.97900 | 0.00000E+00 | .0000 | .0000 | |
| NA2O(L) | 61.97900 | 0.00000E+00 | .0000 | .0000 | |
| NA2SI O3(C) | 122.06380 | 0.00000E+00 | .0000 | .0000 | |
| NA2SI O3(L) | 122.06380 | 9.97652E−08 | .0000 | .0000 | |
| NA2SI2O5(C) | 182.14860 | 0.00000E+00 | .0000 | .0000 | |
| NA2SI2O5(L) | 182.14860 | 0.00000E+00 | .0000 | .0000 | |
| SI O2(C) | 60.08480 | 0.00000E+00 | .0000 | .0000 | |
| SI O2(L) | 60.08480 | 0.00000E+00 | .0000 | .0000 | |

What is claimed is:

1. A gas generator comprising at least first and second adjacent gas generation compartments, each being capable of discharging gas therefrom at a different time and different volumetric rate, wherein each compartment contains the same propellant and initiator, further wherein the propellant has a different geometry in each compartment which results in different rates of gas evolution from each compartment upon initiation such that the ratio of gas generation in the first compartment to that in the second compartment is greater than one; and also wherein said propellant consists essentially of on a weight basis approximately (a) 84–95% of phase-stabilized ammonium nitrate as an oxidizer, (b) 3.4–13.4% of a fuel selected from the group consisting of CL-20, RDX, HMX, TATB, LLM-105, EDNA, and mixtures thereof, and (c) 1.5–2.6% of a binder selected from the group consisting of PCL, PIB, and polyvinylpyrrolidone, and mixtures thereof, the products of combustion of said propellant being non-toxic gases.

2. The gas generator of claim 1, wherein said oxidizer is ammonium nitrate, said fuel is CL-20, and said binder is polycaprolactone.

3. The gas generator of claim 2, wherein said ammonium nitrate comprises approximately 89.5%, said CL-20 comprises approximately 8.4%, and said polycaprolactone comprises approximately 2.1% of said propellant.

4. The gas generator of claim 1 having 2 compartments, wherein the change of pressure as a function of time from the first of said compartments is at least 2 times greater than the change of pressure as a function of time from the second of said compartments.

5. The gas generator of claim 1, wherein the products of combustion of said propellant consist of water, nitrogen and $CO_2$.

6. The gas generator of claim 1, wherein said propellant is made by a. preparing a mixture of the components of said propellant in wet or dry form,
   b. forming said mixture into tablets, disks or granules,
   c. if wet, allowing said tablets, disks or tablets to dry, and
   d. perforating said tablets, disks or tablets to achieve the desired geometry.

7. The gas generator of claim 1, wherein said propellant has density greater than or equal to approximately 92% of theoretical density.

8. A vehicle airbag system comprising
   a. the gas generator of claim 1,
   b. an uncoated airbag.

9. A process for controlling the rate of inflation of a vehicle airbag comprising the sequential steps of:
   a. connecting to said vehicle airbag the gas generator of claim 1,
   b. causing each of said chambers to discharge at a different, predetermined time, and
   c. causing the effluent of each of said chambers to flow into said airbag.

10. A vehicle airbag system comprising
    a. the gas generator of claim 3, and
    b. an uncoated airbag.

11. A vehicle airbag system comprising
    a. the gas generator of claim 4, and
    b. an uncoated airbag.

12. A vehicle airbag system comprising
    a. the gas generator of claim 5, and
    b. an uncoated airbag.

13. A vehicle airbag system comprising
    a. the gas generator of claim 6, and
    b. an uncoated airbag.

14. A vehicle airbag system comprising
    a. the gas generator of claim 7, and
    b. an uncoated airbag.

15. A process for controlling the rate of inflation of a vehicle airbag comprising the sequential steps of:
    a. connecting to said vehicle airbag the gas generator of claim 3,
    b. causing each of said compartments to discharge at a different, predetermined time, and
    c. causing the effluent of each of said compartments to flow into said airbag.

16. A process for controlling the rate of inflation of a vehicle airbag comprising the sequential steps of:
    a. connecting to said vehicle airbag the gas generator of claim 4,
    b. causing each of said compartments to discharge at a different, predetermined time, and
    c. causing the effluent of each of said compartments to flow into said airbag.

17. A process for controlling the rate of inflation of a vehicle airbag comprising the sequential steps of:
    a. connecting to said vehicle airbag the gas generator of claim 5,
    b. causing each of said compartments to discharge at a different, predetermined time, and
    c. causing the effluent of each of said compartments to flow into said airbag.

18. A process for controlling the rate of inflation of a vehicle airbag comprising the sequential steps of:
    a. connecting to said vehicle airbag the gas generator of claim 6,
    b. causing each of said compartments to discharge at a different, predetermined time, and
    c. causing the effluent of each of said compartments to flow into said airbag.

* * * * *